US009090444B2

(12) United States Patent
Hart

(10) Patent No.: US 9,090,444 B2
(45) Date of Patent: Jul. 28, 2015

(54) NOZZLE FLOW CONTROL STRUCTURE

(75) Inventor: Burton L. Hart, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 31 days.

(21) Appl. No.: 12/901,906

(22) Filed: Oct. 11, 2010

(65) Prior Publication Data

US 2011/0083764 A1 Apr. 14, 2011

Related U.S. Application Data

(60) Provisional application No. 61/250,797, filed on Oct. 12, 2009.

(51) Int. Cl.

*B67D 3/00* (2006.01)
*F16K 21/00* (2006.01)
*B67D 3/04* (2006.01)

(52) U.S. Cl.

CPC ... *B67D 3/04* (2013.01); *B67D 3/00* (2013.01)

(58) Field of Classification Search

CPC ...... B05B 1/265; B05B 1/262; B05B 15/069; B05B 1/14; B05B 1/267; F16K 21/00; B67D 3/04; B67D 3/00
USPC .......................... 239/461, 498, 502; 137/801
See application file for complete search history.

(56) References Cited

U.S. PATENT DOCUMENTS

| | | | | | |
|---|---|---|---|---|---|
| 2,044,445 | A | * | 6/1936 | Price et al. | 239/458 |
| 2,754,097 | A | * | 7/1956 | Hjulian | 239/428.5 |
| 4,044,998 | A | | 8/1977 | Giese | |
| 4,356,975 | A | | 11/1982 | Chadshay | |
| 4,378,164 | A | * | 3/1983 | Manfroni | 366/177.1 |
| 4,434,976 | A | | 3/1984 | Murakami et al. | |
| 4,589,577 | A | * | 5/1986 | Welsh et al. | 222/518 |
| 4,901,887 | A | | 2/1990 | Burton | |
| 4,907,725 | A | | 3/1990 | Durham | |
| 5,570,822 | A | * | 11/1996 | LeMarbe et al. | 222/459 |
| 5,842,617 | A | | 12/1998 | Younkle et al. | |
| 6,119,965 | A | * | 9/2000 | Chang | 239/467 |
| 6,676,029 | B2 | | 1/2004 | Mitchell | |
| 6,840,281 | B1 | | 1/2005 | Amidzich | |
| 6,957,500 | B2 | | 10/2005 | McCambridge et al. | |

* cited by examiner

*Primary Examiner* — Melanie Tyson
*Assistant Examiner* — Chee-Chong Lee
(74) *Attorney, Agent, or Firm* — Barnes & Thornburg LLP

(57) ABSTRACT

A faucet assembly for use with a beverage retaining container. The faucet assembly includes a nozzle having a plurality of axially oriented ribs extending inwardly from an inside wall of the nozzle. Each rib of the plurality of ribs defining an axial projection having a generally triangular cross sectional shape. Neighboring ribs defining a corresponding void having a complementary generally triangular cross section. The nozzle having a relatively short axial dimension and the ribs providing desirable flow characteristics.

12 Claims, 6 Drawing Sheets

NOZZLE FLOW CONTROL STRUCTURE

CROSS REFERENCE TO RELATED APPLICATIONS

This patent application claims the benefit of priority under 35 U.S.C. §119(e) to U.S. Provisional Application No. 61/250,797, filed Oct. 12, 2009. The disclosure set forth in the referenced provisional application is incorporated herein by reference in its-entirety, including all information as originally submitted to the United States Patent and Trademark Office.

BACKGROUND

The present invention relates to faucets for beverage dispensers and in particular the structure of a faucet to facilitate desirable flow characteristics.

By way of background a variety of faucets have been developed which include an outlet passage communicating with a reservoir and a dispense passage connected to the outlet passage. The dispense passage is the passage defined by a nozzle or dispensing tip. A controllable valve assembly is attached to the faucet body for controllably dispensing beverage from the outlet passage to the dispense passage. A variety of valve orientations have been developed which place a dispensing handle on the top of the faucet body or on the front of the faucet body. Generally, the outlet passage is at a right angle to the dispense passage, although other configurations could be produced.

Such a valve assembly can be designed for a variety of applications and flow rates. Flow rates generally can be adjusted by increasing or decreasing the capacity of the outlet passage and dispense passage to either allow a greater or lesser amount of fluid to flow through the corresponding passages. Depending on the application, other structures or features can be modified, added, removed, or otherwise changed to obtain various desirable dispensing characteristics.

One of the dispensing characteristics that may be desirable for dispensing is the structure of the flow path or stream flowing from the dispense passage. In this regard, it may be desirable with hot substances or substances that stain or otherwise could result in a mess to have a generally coherent flow path or stream. By way of example, when dispensing coffee, it is desirable to maintain a generally coherent stream at least until the beverage reaches a corresponding container or cup. Maintaining a coherent stream prevents or reduces the chance of splattering, producing too wide or moving or unpredictable stream. It is desirable to keep the flow generally coherent so that it can arrive in the container without creating a mess. Additionally, there may be benefits to maintaining heat in a heated beverage by maintaining a relatively flow path, which prevents aeration of the beverage as it is dispensed. In other words, to maintain a coherent flow path maintains the heat energy within the flow and prevents the dissipation of the heat by transfer through a more dispersed flow.

At least one form of prior art faucet includes a dispense path which is has four lugs or ribs extending generally inwardly from an inside surface of the dispense path. In other words, the dispense path of the nozzle is defined as a generally straight, cylindrical passage extending through the nozzle structure with generally axial protrusions or ribs extending into the flow. An inside surface of the dispense path is defined by the walls of the nozzle. The ribs generally extend the length of the inside surface. These ribs produce a directional flow to the liquid passing through the dispense path. Many faucet designs have generally adopted this four rib approach.

Developments relating to faucet design have questioned the use of a four rib approach in all applications. In particular, a faucet having a relatively short nozzle length may not produce a dispensing stream from the nozzle satisfying a diverse variety of dispensing characteristics. The shortened path of the dispense passage may not provide sufficient length over which the four ribs can influence the characteristics of the flow. As such, there is a need to develop an improved faucet design, which provides desirable flow characteristics in a faucet, which has relatively short nozzle and corresponding dispense passage.

DESCRIPTION OF THE DRAWINGS

The organization and manner of the structure and function of the disclosure, together with the further objects and advantages thereof, may be understood by reference to the following description taken in connection with the accompanying drawings, and in which:

FIG. 4 is a side elevational cross-sectional view taken along line 4-4 in FIG. 3 showing the generally horizontal orientation of the outlet passage communicating with the generally perpendicularly or vertically oriented dispense passage, the inside surface of the dispense passage including the plurality of generally aligned and radial oriented protrusions, the outlet passage and dispense passage communicating in the valve cavity defined by the valve housing, the valve assembly being removed there from;

FIG. 6 is a partial fragmentary front cross-section view taken along line 6-6 showing another view of the dispense passage and the corresponding protrusions or ribs extending there through.

DETAILED DESCRIPTION

Figure 1:
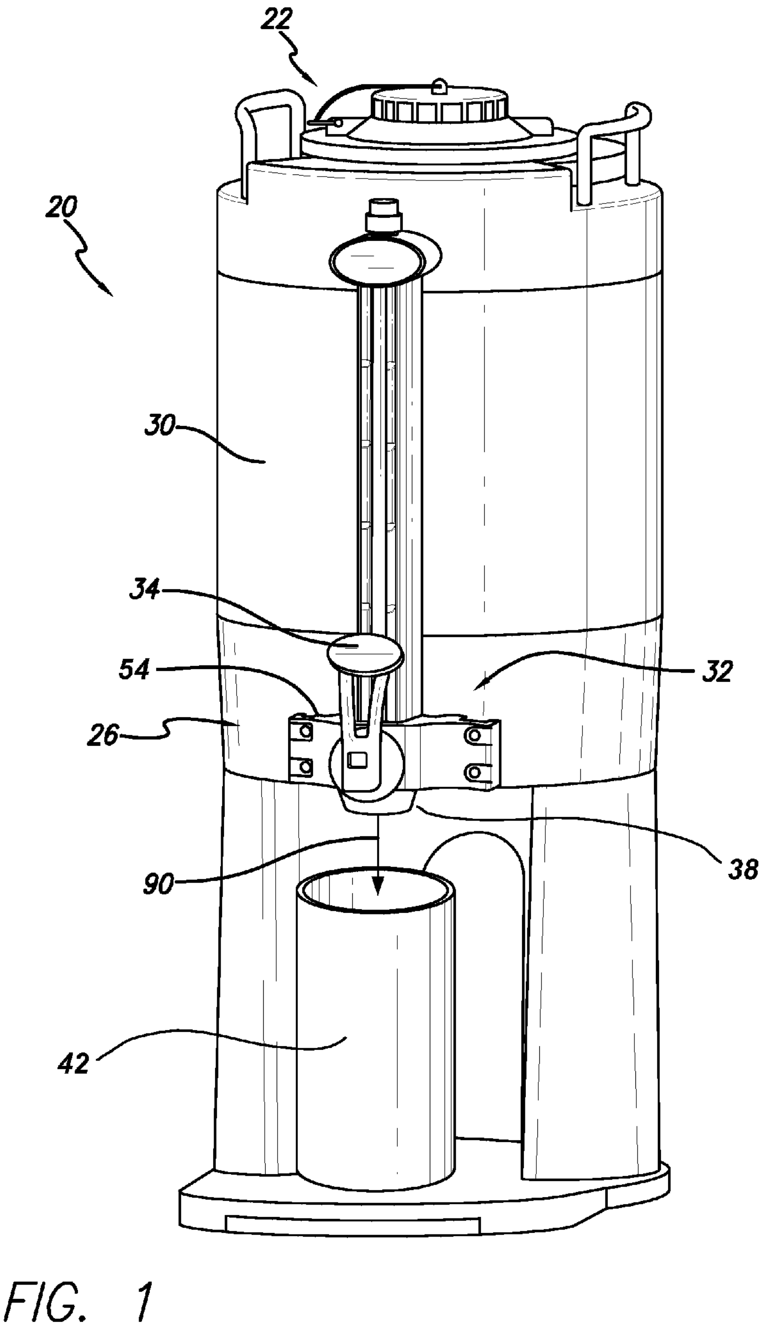
FIG. 1 is a perspective view of a server having a faucet attached thereto, the faucet includes a faucet body and control handle, the faucet body includes mounting shoulders, a valve housing, and a nozzle.

While the present disclosure may be susceptible to embodiment in different forms, there is shown in the drawings, and will be described herein in detail, one or more embodiments with the understanding that the present description is to be considered an exemplification of the principles of the disclosure and is not intended to be exhaustive or to limit the disclosure to the details of construction and the arrangements of components set forth in the following description or illustrated in the drawings.

A beverage server 20 is shown in FIG. 1. The server 20 is of the type, which may include a beverage retaining container or thermal vessel such as a stainless steel double walled vacuum chamber or a glass vacuum chamber. Such a server is well known in the art and is used for retaining and selectively dispensing beverage. The server 20 generally has a top entry through which beverage is dispensed. A cavity defined in the inside of the vessel retains the beverage in a heated state. The thermal construction of the server through vacuum chambers, insulation or a combination of components maintains the beverage in a heated condition.

A faucet assembly 26 is attached to the outside surface 30 of the server 20. The faucet assembly 26 includes a faucet body 32, a valve assembly 34, and a nozzle 38. The valve assembly 34 is used to controllably dispense beverage from the server 20 through the faucet assembly 26. When the valve assembly 34 is actuated beverage is dispensing from the nozzle to a container or cup 42 positioned below the nozzle 38.

Figure 4:
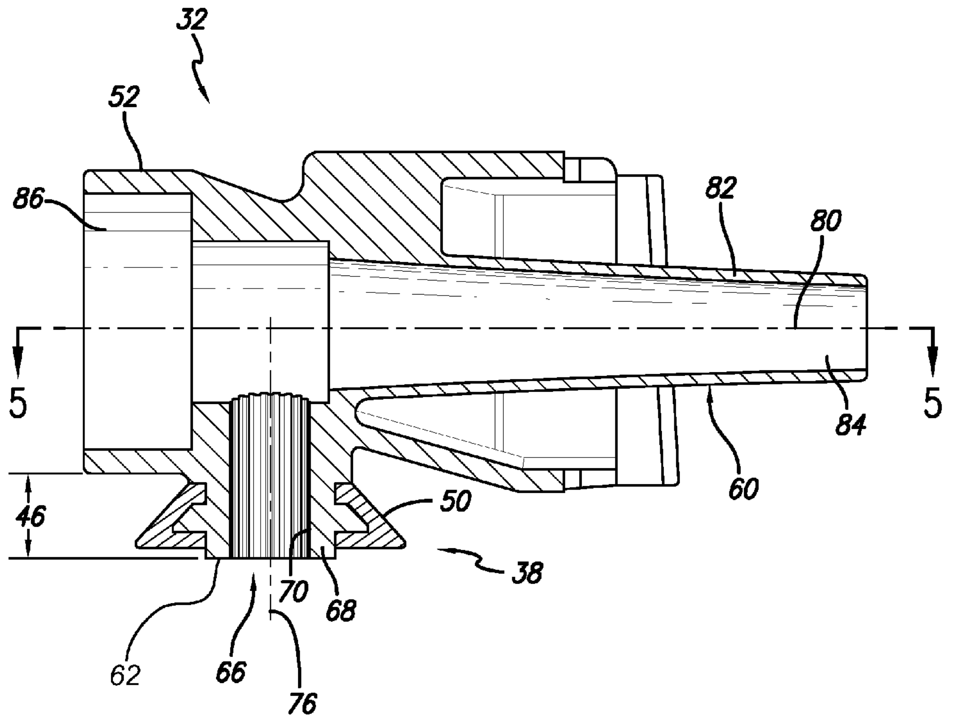
Figure 5:
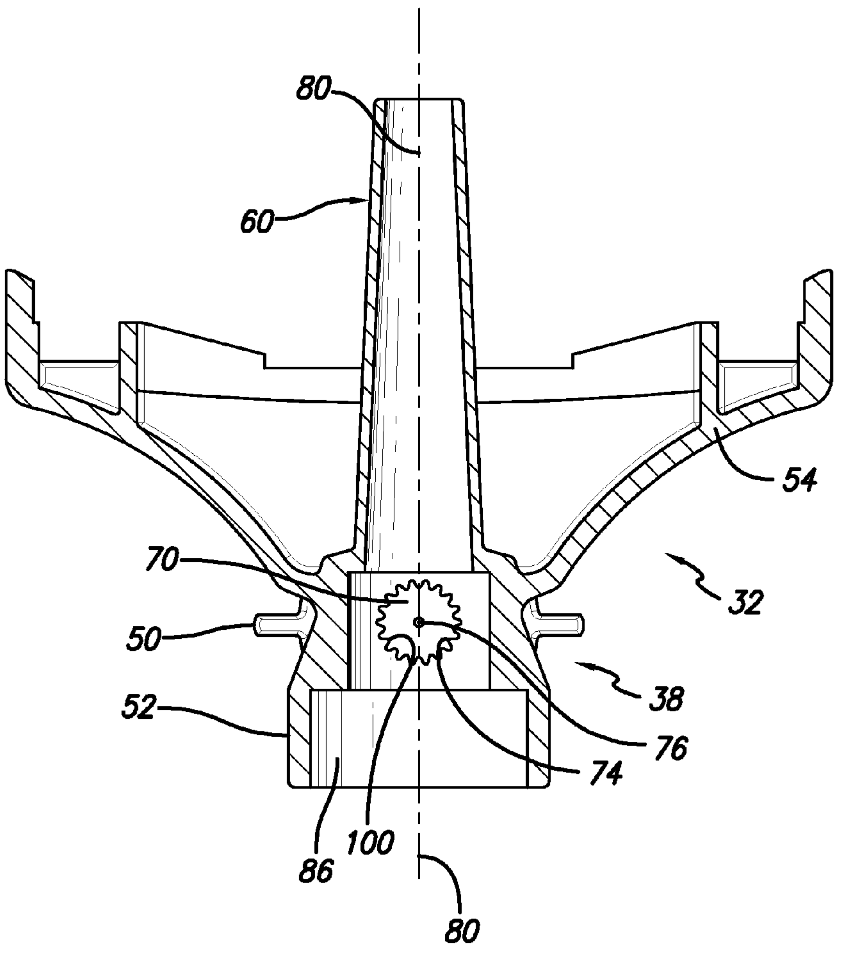
FIG. 5 is a partial fragmentary, cross-sectional view taken along line 5-5 in FIG. 4 showing the dispense passage and corresponding protrusions extending through he valve passage.
Figure 6:
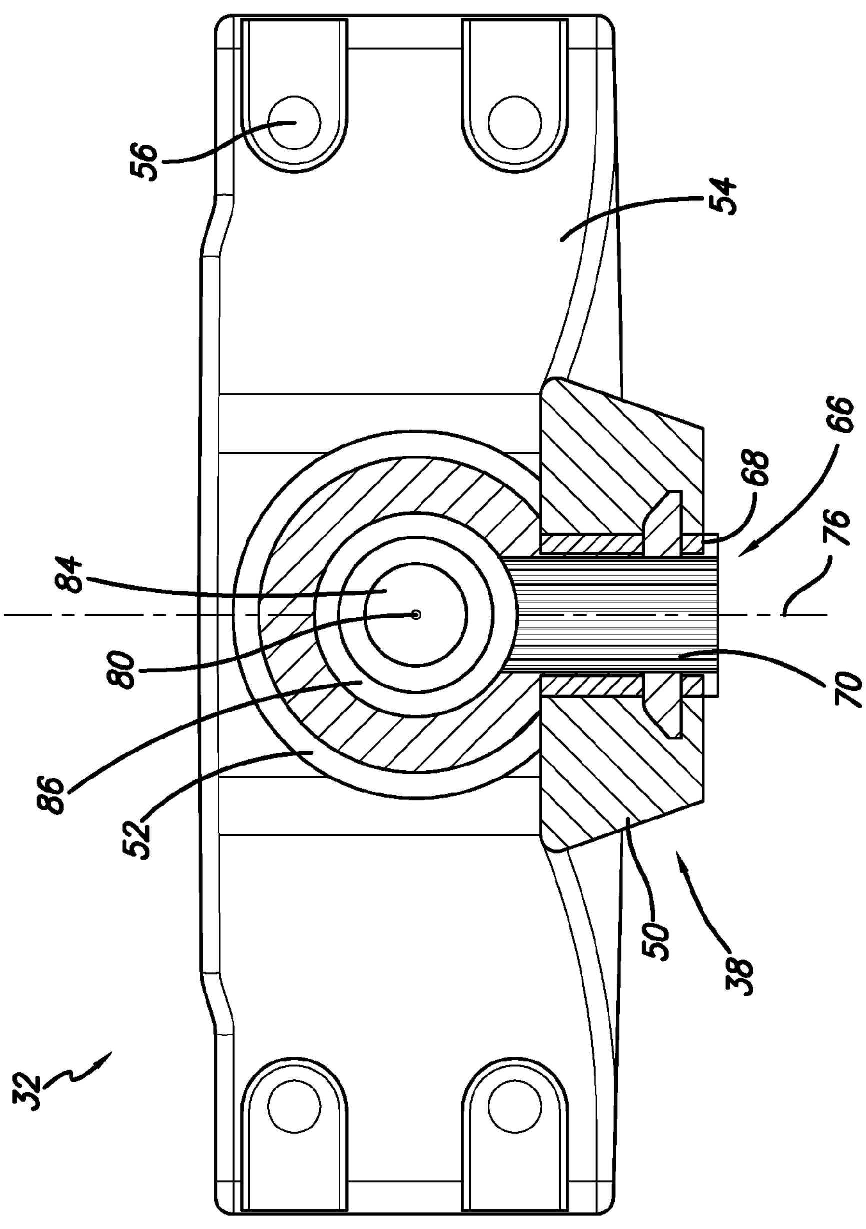

With reference to FIG. 4, in some circumstances it may be desirable to reduce the vertical dimension 46 which the nozzle 38 extends downwardly from the faucet body 32. Controlling this dimension 46 helps to control the clearance underneath the nozzle 38. The clearance underneath the nozzle 38 may be important so that a variety of cup 42 sizes can be used with the server 20. In other words, the longer a nozzle extends below the faucet body fewer choices of cup types, measured by a vertical dimension, can be selected for convenient use with a server 20. Additionally, it may be desired to provide a locator or other form of indicator 50 on the nozzle 38 so as to show the location of the nozzle 38 relative to the faucet body 32.

Figure 2:
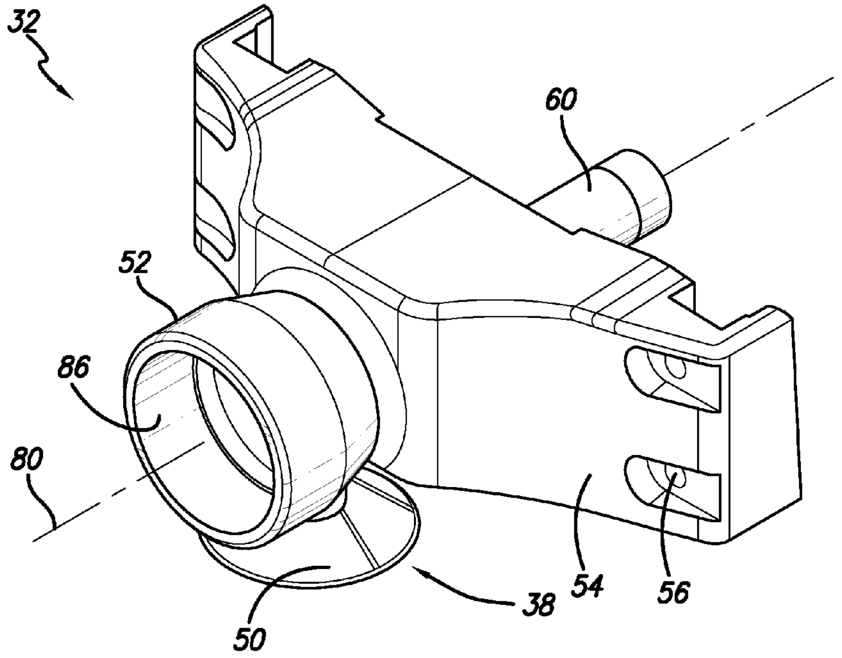
FIG. 2 is an enlarged partial assembly view of the faucet body including the mounting shoulders, valve housing, nozzle, with the faucet body removed from the server, and the valve structure removed from the valve housing, an outlet tube extending from the faucet body for engagement and communication with a reservoir in the server.

With regard to FIGS. 2-6, a valve housing 52 of the valve assembly 34 is shown. The components of the valve assembly 34 have been removed from the valve housing 52 so as to highlight the features associated with the faucet. As shown in FIG. 2, mounting shoulders 54 are provided on the faucet body. The mounting shoulders provide locations or mounting bores 56 which can receive fasteners to allow the faucet body 32 to be mounted to the outside surface 30 of the server 20. As will be described in greater detail with the reference to the other figures, an outlet tube 60 extends from the faucet body towards the server 20 for communication with a cavity of the reservoir retained in the server.

Figure 3:
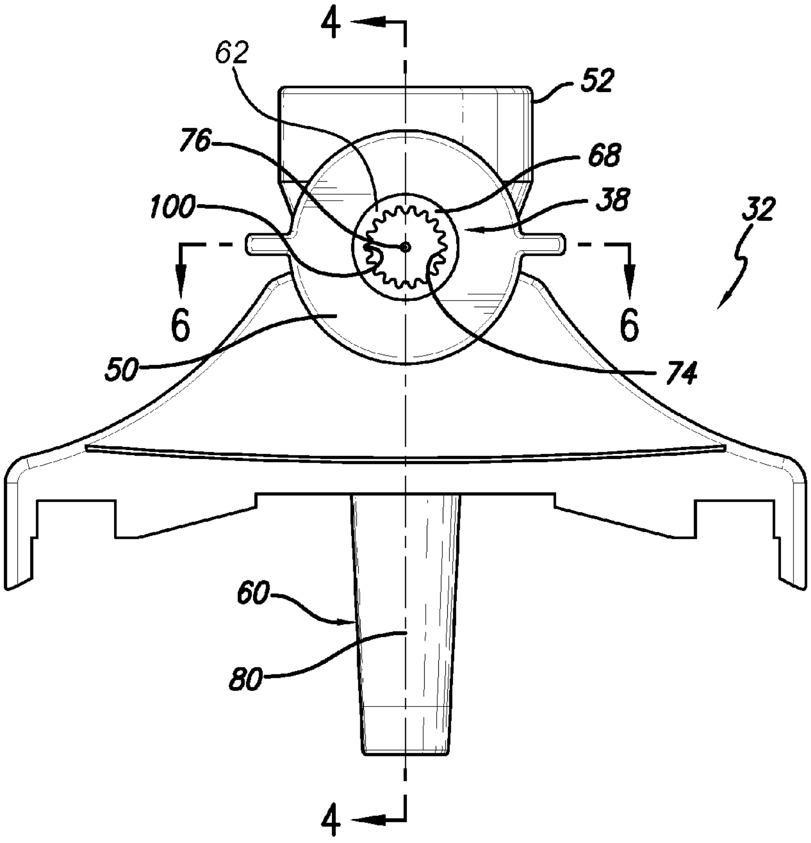
FIG. 3 is a bottom plan view of the faucet body as shown in FIG. 2 showing a dispense passage defined by a wall of the nozzle and including a plurality of protruding rib structures which extend radially inwardly from an inside surface of the dispense passage towards an axis of the dispense passage.

As shown in FIG. 3, the bottom plan view is directed upwardly towards a mouth 62 of the nozzle 38. The mouth 62 is generally circular in cross-section defining a dispense passage 66 of the nozzle 38. A wall 68 defining the nozzle 38 defines the passage 66. An inside surface 70 of the wall 68 is provided with a plurality of rib structures 74. The dispense passage 66 and rib structure 74 are generally axially aligned with a dispense axis 76 extending through the dispense passage 66. A similar outlet axis 80 is defined relative to the outlet tube 60. A wall 82 of the outlet tube 60 defines an outlet passage 84 there through. The outlet passage 84 is oriented for communicating with the beverage container.

The outlet passage 84 has generally horizontal orientation and the dispense passage 66 has generally vertical orientation. The passages 84, 66 intersect and communicate in a relatively perpendicular relationship in a valve cavity 86 defined by the valve housing 52. The dispense passage communicating with the outlet passage in a non-axially aligned orientation for directing the flow path of beverage flowing from the outlet passage. The valve cavity 86, which is shown as being empty in FIG. 4, is provided to receive valve assembly components. The valve assembly components are attached to the valve housing and faucet body for retaining the valve in a controllable orientation relative to the faucet. Although, the specific valve assembly details are not shown in the drawings, one of ordinary skill in the art could employ a variety of valve assemblies in the cavity 86 without undue experimentation as such valve assemblies are well known in the art. In this regard, the valve assemblies may include a manually operated valve as well as an electrically operated valve. Any one of a variety of valve assembly of known construction may be used to provide control of the flow through the outlet passage to the nozzle. The term or reference to a valve assembly is to be broadly interpreted as any valve assembly which can be used to controllably dispense liquid from one path to another path.

As mentioned, faucet assemblies have been designed which include four spaced apart internal ribs. The function of the ribs is to help straighten or provide a more coherent flow path or stream dispensed from the nozzle. In other words, absence of ribs tends to allow the flow path to become more diffused creating the potential for splattering or more dispersed flow path. It is desirable to provide a more coherent flow path so that beverage 90 flowing from the faucet 26 to a cup 42 is dispensed into the cup with a controlled flow. A controlled flow is desirable to minimize splashing or cooling of the liquid. Splashing is undesirable to prevent the user of the server from being contacted by the beverage which could wet the user's clothing.

Maintaining a coherent flow path may also be desirable to help maintain the temperature of the beverage being dispensed. In this regard, a more diffused flow path may cause the beverage to interact with the ambient atmosphere thereby providing some heat transfer from the liquid to the ambient atmosphere and reducing the temperature of the beverage dispensed into the cup 42. A controlled stream is less diffused and as a result has less surface area to interact with the surrounding ambient atmosphere and therefore can retain and maintain more heat energy from the nozzle to the cup.

One of the characteristics which the prior art apparently has not address is the dimension 46 of the nozzle 38. In the present embodiment, the dimension 46 of the nozzle 38 has been reduced so as to maximize the space below the faucet assembly 26 for receiving cups there under. If the nozzle 38 extends too far downwardly away from the faucet, the vertical dimension between the cup and a corresponding surface is reduced. For example, it may be desirable to place the cup on a countertop or a drip tray when dispensing from the server. As such, it is desirable to maximize the dimension between the top surface of the counter and the bottom surface of the nozzle so as to facilitate the use of the largest possible cup. However, the height of the nozzle is limited by the dimensions of the server body. The server has a limited height to meet industry expectations for use and may also have width restrictions. Additionally, it also may be desirable to allow the cup to be placed directly under the faucet without tipping the cup relative to the nozzle to receive beverage there under. Tipping the cup could result in spilling beverage into the drip tray or on the countertop and could result in dipping the nozzle 38 into the cup.

With the foregoing in mind, it was found that the use of the four inwardly projecting ribs did not provide the desired flow characteristics in combination with a shortened nozzle. The relatively short length 46 of the nozzle 38 required the use of different flow straightening or flow directing characteristic structures. The plurality of inwardly projecting ribs provided multiple improvements. The multiple ribs provided a relatively good and coherent dispense stream over a range of dispensing flow rates. A dispensing flow rate of a small amount of fluid flowing from the outlet passage to the dispense passage 66 maintained a coherent stream as well as allowing the maximum flow rate through the passages. In other words, regardless of the flow rate through the faucet, from a slightly opened valve to a fully opened valve, the stream produced desirable flow characteristics.

It is important to provide desirable flow characteristics over a range of dispense rates and conditions for a variety of reasons. Generally, a user may initiate the dispensing of fluid through the faucet by slowly opening or "cracking" the valve. As such, a desirable flow characteristic is important at the beginning stage of dispensing. As the user becomes more comfortable over the dispensing event, the valve may be opened near or at the maximum flow rate. Once again, a desirable flow characteristic is important. As the user completes the dispensing event, the valve is closed significantly so as to not overflow the cup. Additionally, a user may dispense small additional quantities to "top off" a cup either after some has been consumed or at the end of a dispensing event. As such, it is desirable to provide that the desirable flow characteristics over this range of dispensing flow rates.

Another, improvement is that the cumulative volume occupied by the small plurality of ribs in the passage can be dimensioned to be smaller than the corresponding volume occupied by the four protruding ribs as used in the prior art. As such, desirable flow characteristics can be achieved by employing a plurality of smaller ribs, which cumulatively results in a reduced volume occupied by the ribs or other flow straightening structures compared to the four ribs in the prior art. This is important since reducing the volume occupied by a structure increases the volume that can occupied by a fluid. The increase flow through volume allows an increased dispense rate using generally identical structural dimensions. In other words, if the four protruding straightened rib structure were use as in the prior art the flow rate through the nozzle would be reduced.

As an additional benefit, the shortened faucet may also help maintain the temperature of the beverage within the server. In this regard, the faucet body 32 has some degree of heat sinking characteristics. The material defining the outlet passage 84 communicates directly with the fluid in the server. Heat can be transferred through the wall 82 to the faucet body 32. Some measure of heat energy is transferred from the wall 82 to the larger faucet body 32. As heat energy is transferred to the faucet body 32 it would be desirable to minimize the features of the faucet body so as to minimize the heat transfer. Shortening the nozzle 38 helps reduce the material and the length and surface area of potential heat transfer structures. As such the shortened length 46 of the nozzle 38, while maintaining desirable flow characteristics, as a result of the dispense passage 66 including the plurality of structures 74, helps to maintain higher temperature and a longer dispense time for the beverage retained in the server 20.

As shown in the illustration, eighteen inwardly extending rib structures 74 are provided in the nozzle shown in the figures. Also, the general cross-sectional shape of the ribs 74 are shown as being generally triangular. The triangular rib structure produces a corresponding generally triangular void 100 between neighboring ribs. The combination of the shape and size of the ribs 74 and the corresponding voids 100, can be scaled upwardly or downwardly depending on various characteristics associated with dispensing, fluid, and stream characteristics as well as sanitation characteristics.

It may be desirable to maintain a range of greater than 4 ribs but less than 50 ribs so as to provide a balance between providing desirable dispense streams characteristics and sanitation characteristics. With regard to sanitation characteristics, it may be desirable to provide large enough rib structures and corresponding voids to facilitate ease of cleaning. If the structures are too small it may produce a more challenging cleaning operation. Additionally, it may be desirable to provide a balance between the size and projection of the ribs 74 for manufacturability ease, consistency and cost efficiency. In this regard, manufacturing tolerances, injection mold design, cosmetic effects of the number of ribs may dictate fewer or more ribs and larger or smaller spacing. This consideration may facilitate more convenient or economical manufacturing.

The cross-sectional shape of the rib 74 is generally shown as triangular. However, the triangular shape could be curved, squared, arched or other features to produce similar dispense characteristics. As such, use of the triangular feature is intended to show a currently preferred embodiment and is not intended to limit the cross-sectional shape of the rib structures.

In use, the faucet assembly 26 of the present disclosure is attached to the outside surface 30 of a server 20. An outlet tube 60 and passage 84 communicate with a reservoir in the server 20 for receiving beverage there from. A valve assembly 34 on the faucet assembly 26 is used to control the dispensing of beverage from the server 20 through the faucet 26. When the valve assembly 34 is actuated beverage can flow from the outlet passage 84 to the dispense passage 66.

Inwardly extending radial oriented ribs 74 on the inside surface 70 of the dispense passage 66 facilitate desirable dispensing characteristics of the stream of beverage dispensed from the nozzle 38 of the faucet 26. As fluid flows from the nozzle 38 to the cup 42, a generally coherent stream is dispensed into the cup 42. A generally coherent stream is desirable so as to prevent splashing, temperatures reduction, and ease of targeting the beverage from the faucet 26 into the cup 42. A variety of cross-sectional shapes can be used for the ribs 74 but generally, a triangular shape has been employed in the present disclosure by way of illustration and not limitation.

Similarly, eighteen generally axially aligned ribs 74 have been shown but this number of ribs 74 is shown by way of illustration and not limitation. A range of cross-sectional shapes, sizes, and orientations can be employed to achieve a similar result. The increased number of ribs 74 on the inside surface 70 of the nozzle 38 has been discovered to be beneficial in applications where the nozzle dimension 46 has been shortened relative to the overall faucet.

While embodiments have been illustrated and described in the drawings and foregoing description, such illustrations and descriptions are considered exemplary and not restrictive in character, it being understood that only illustrative embodiments have been shown and described and that all changes and modifications that come within the spirit of the invention are desired to be protected. The applicants have provided description and figures, which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

The invention claimed is:

1. A faucet assembly for use with a beverage retaining container for use in the controllable dispensing of liquid from the container, the faucet assembly comprising:

a faucet body attachable to the container;

an outlet passage defined in the faucet body and oriented for communication with the beverage container, an outlet axis defined in the outlet passage;

a nozzle defined in the faucet body and communicating with the outlet passage in a non-axially aligned orientation for directing the flow path of beverage flowing from the outlet passage, a dispense axis defined in the nozzle;

a valve assembly carried on the faucet body and positioned between the outlet passage and the nozzle for facilitating controlled dispensing of beverage from the container through the faucet assembly;

a wall of the nozzle defining an inside surface of the nozzle;

at least ten ribs in the inside surface of the nozzle, the ribs being axially oriented inwardly towards and aligned with the dispense axis;

each rib of the plurality of ribs defining an axial projection having a generally triangular cross sectional shape, neighboring ribs defining a corresponding void having a generally complementary generally triangular cross sectional shape with the ribs being generally symmetrical about the dispense axis and with the voids being generally symmetrical about the dispense axis; and each of the ribs extending axially along the entire length of the inside surface of the nozzle from an intersection with the outlet passage to a mouth of the nozzle positioned distal from the outlet passage.

2. The faucet assembly of claim 1, the nozzle having a dispense passage length which is less than a corresponding outlet passage length for reducing the material that can radiate heat from the faucet body.

3. The faucet assembly of claim 1, the nozzle having from 10 to 50 inwardly projecting, axially parallel ribs, all of the ribs being equally sized and dimensioned and equally spaced around the inside surface of the wall of the of the nozzle.

4. The faucet assembly of claim 1, the nozzle having an indicator positioned on the nozzle positioned proximate the mouth to indicate the location of the nozzle relative to the faucet body.

5. The faucet assembly of claim 1, the nozzle having a dispense passage length which is less than one-half of a corresponding outlet passage length.

6. The faucet assembly of claim 1, each of the ribs of the nozzle having a generally triangular cross sectional shape, neighboring ribs defining a corresponding void having a complementary generally triangular cross section.

7. A faucet assembly in combination with a beverage retaining container for use in the controllable dispensing of liquid from the container comprising:

the container defining a cavity therein for retaining beverage therein;

a faucet body attached to the container;

an outlet passage defined in the faucet body and oriented for communication with the beverage container cavity, an outlet axis defined in the outlet passage;

a nozzle defined in the faucet body and communicating with the outlet passage in a non-axially aligned orientation for directing the flow path of beverage flowing from the outlet passage, a dispense axis defined in the nozzle;

a valve assembly carried on the faucet body and positioned between the outlet passage and the nozzle for facilitating controlled dispensing of beverage from the container cavity through the faucet assembly;

a wall of the nozzle defining an inside surface of the nozzle;

at least ten ribs in the inside surface of the nozzle, the ribs being axially oriented inwardly toward and aligned with the dispense axis;

each rib of the plurality of ribs defining an axial projection having a generally triangular cross sectional shape, neighboring ribs defining a corresponding void having a generally complementary generally triangular cross sectional shape with the ribs and voids being generally symmetrical about the dispense axis and with the voids being generally symmetrical about the dispense axis; and each of the ribs extending axially along the entire length of the inside surface of the nozzle from an intersection with the outlet passage to a mouth of the nozzle positioned distal from the outlet passage.

8. The faucet assembly in combination with a beverage retaining container of claim 7, the nozzle having a dispense passage length which is less than a corresponding outlet passage length for reducing the material that can radiate heat from the faucet body.

9. The faucet assembly in combination with a beverage retaining container of claim 7, the nozzle having from 10 to 50 inwardly projecting, axially parallel ribs, all of the ribs being equally sized and dimensioned and equally spaced around the inside surface of the wall of the of the nozzle.

10. The faucet assembly in combination with a beverage retaining container of claim 7, the nozzle having an indicator positioned on the nozzle positioned proximate the mouth to indicate the location of the nozzle relative to the faucet body.

11. The faucet assembly in combination with a beverage retaining container of claim 7, the nozzle having a dispense passage length which is less than one-half of a corresponding outlet passage length.

12. The faucet assembly in combination with a beverage retaining container of claim 7, each of the ribs of the nozzle having a generally triangular cross sectional shape, neighboring ribs defining a corresponding void having a complementary generally triangular cross section.

* * * * *